Patented Feb. 23, 1943

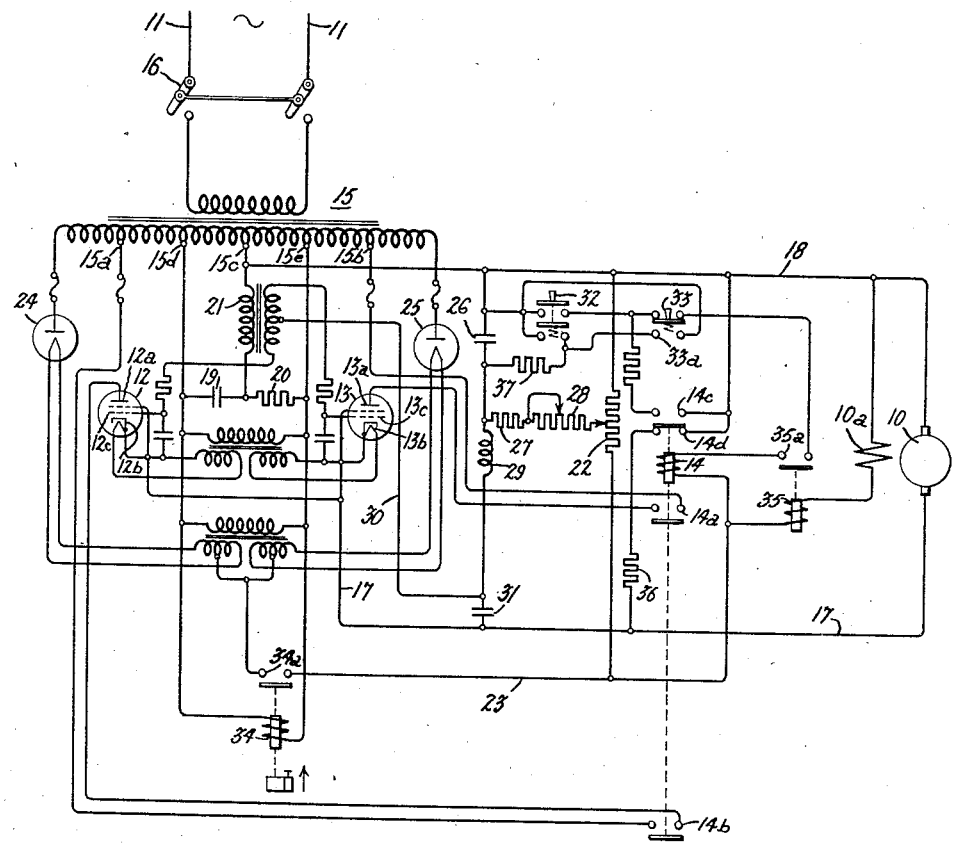

2,312,116

UNITED STATES PATENT OFFICE 2,312,116

CONTROL SYSTEM

Elmo E. Moyer and Orrin W. Livingston, Scotia, N. Y., assignors to General Electric Company, a corporation of New York Application November 27, 1941, Serial No. 420,654

9 Claims. (Cl. 172—288)

This invention relates to control systems, more particularly to systems for controlling the starting, acceleration and stopping of electric motors, and it has for an object the provision of a simple, reliable, inexpensive, and improved control system of this character.

More specifically, the invention relates to starting control systems in which electric valve means are utilized to transmit unidirectional currents from a source of alternating voltage to a direct current motor, and a further object of this invention is the provision of means for effecting smooth, stepless acceleration of the motor from standstill to full speed.

Another object of the invention is the provision in motor control systems of this character for effecting automatic acceleration of the motor from standstill to full speed.

Still another object of the invention is the provision of means for presetting the desired operating speed of the motor and then accelerating the motor to such preset speed.

In carrying the invention into effect in one form thereof, unidirectional current is supplied from a source of alternating voltage through an electric valve means. The electric valve means is provided with a cathode and an anode connected across the source and is also provided with a control grid for controlling the transmission of current from the source to the motor. For the purpose of controlling the acceleration of the motor, a timing circuit is provided including an electrical energy storage device and connections from the energy storage device to the grid, so that the voltage of the grid relative to the cathode of the valve depends upon the difference of the countervoltage of the motor and the voltage across the energy storage device. An adjustable voltage drop device is included in circuit with the energy storage device for presetting the speed of the motor, and a starting control device is provided for initiating the charging of the energy storage device thereby to initiate acceleration of the motor. For a better and more complete understanding of the invention, reference should now be had to the following specification and to the accompanying drawing, the single figure of which is a simple schematic diagram of an embodiment of the invention.

Referring now to the drawing, a direct current electric motor 10 is to be started and operated by unidirectional current supplied from a source of alternating current which is represented by the two supply lines 11. Valves 12 and 13 rectify the alternating current and supply a controlled amount of rectified current to the armature of the motor 10.

These electric valves 12 and 13 are provided with anodes 12a and 13a respectively, with cathodes 12b and 13b respectively, and with control grids 12c and 13c, respectively. The anodes 12a and 13a are connected through the contacts 14a and 14b of a control relay 14 to the intermediate voltage taps 15a and 15b of the secondary winding of a supply transformer 15, the primary winding of which is connected through a line switch 16 to the alternating current source 11. The midpoint 15c of the secondary winding is connected to one terminal of the motor armature and the two cathodes 12b and 12c are connected together and through a conductor 17 to the other armature terminal. As thus connected, the valves 12 and 13 constitute a full wave rectifier with the conductor 17 constituting the positive terminal and the conductor 18 constituting the negative terminal.

Although the electric valves 12 and 13 may be of any suitable type, they are preferably of the type which has an anode, cathode and a control grid and into the envelope of which a small quantity of an inert gas such as mercury vapor or argon is introduced after evacuation. The presence of this gas within the envelope changes the usual pure electron discharge into an arc stream thereby constituting the valve an electrostatically or grid controlled arc rectifier. The grid has no control over the instantaneous value of the current transmitted between the anode and cathode, but only has control over the time in the positive half cycle of anode voltage at which current starts to flow. Accordingly, if the voltage applied to the grid is either an alternating or undulating voltage which has values more positive than the critical grid voltage, the average value of the current transmitted between anode and cathode can be controlled by shifting the phase relationship of the grid voltage with respect to the anode voltage. This may be accomplished, for example, by impressing on the grid a voltage having an alternating current component which is dephased from the anode voltage by a predetermined amount, and also having a variable direct current component. When the grid voltage is exactly in phase with the anode voltage, the current begins to flow in the output circuit at the beginning of the positive half cycle of anode voltage and continues until the anode voltage again passes through zero. This is the condition of maximum current in the output circuit. On the other hand, if the grid voltage is 180 degrees out of phase with the anode voltage, current will not start to flow at any time during the positive half cycle of anode voltage. This is the condition of minimum current flow in the output circuit. For intermediate phase relationships, the current will have correspondingly intermediate average values.

The alternating current component of the grid voltage is derived from the voltage of the source 11 by means of a phase shifting network comprising a capacitor 19 and a resistor 20 connected by taps 15d and 15e across a portion of the secondary winding of the supply transformer. The voltage between the junction point of capacitor 19 and resistor 20 and the midtap 15c is dephased with respect to the anode voltage by 90 electrical degrees lagging and this 90 degree phase lagged voltage is applied to the grid circuit of valves 12 and 13 through a transformer 21 having the opposite terminals of its secondary winding connected respectively to the grids 12c and 13c of valves 12 and 13. The variable direct current bias voltage appears across capacitor 31 and is obtained from a timing circuit connected between the bus 18 and an adjustable point on the voltage divider 22 connected across busses 18 and 23 which are supplied with a direct current voltage derived from the secondary winding of transformer 15 and rectified by means of the two-element rectifier valves 24 and 25.

The timing circuit comprises an energy storage device such for example as the capacitor 26, a fixed resistor 27, and an adjustable resistor 28. The direct current component, i. e. the voltage of the junction point between the capacitor 26 and the resistor 27, is applied to the grid circuit of the valves 12 and 13 through an inductance 29 and a conductor 30 to the midtap of the secondary winding of the grid transformer 21.

The capacitor 31 is connected between the inductance 29 and the conductor 17 between the cathode of the valves 12 and 13 and the terminal of the motor 10. This inductance 29 and the capacitor 31 serve to filter out the ripple in the voltage which would otherwise be present at this point. It will be noted that the timing circuit is independent of the anode-cathode circuit, i. e., there is no direct conductor connection between the cathodes 12b and 13b and the grids 12c and 13c and consequently the voltages of the grids do not change when the cathode voltages vary. A starting control switching device illustrated as a push button type switch 32 is provided for initiating the acceleration of the motor 10 and a stop control switching device 33 illustrated as a push button type switch having a pair of normally closed and a pair of normally open contacts is provided for initiating the deceleration and stopping of the motor. In order to prevent destruction of the cathodes by closing the anode-cathode circuit prior to the time at which the cathodes have been brought to the proper temperature, a suitable time delay relay 34 is provided. The contacts of the time delay relay 34 are included in series relationship with the operating coil of the control relay 14 and thereby prevent energization of the control relay 14 to close the anode-cathode circuits of the valves 12 and 13 until the contacts of the time delay relay 34 have closed.

For the purpose of protecting the motor against the condition of loss of field, a field protective relay 35 having its operating coil in series with the shunt field winding 10a of the motor 10 and having its contacts in series relationship with the operating coil of the control relay 14 is provided.

Dynamic braking of the motor 10 to rest is provided by means of a dynamic braking resistor 36 which is arranged to be connected across the armature terminals of the motor 10 when the control relay 14 is deenergized.

With the foregoing understanding of the elements and apparatus and their organization in the completed system, the operation of the system itself will readily be understood from the following detailed description.

The line switch 16 is first closed to complete the connections of the primary winding of the transformer 15 to the alternating current source 11. As a result of the connection of the primary winding of the transformer 15 to the source, and after time closing relay contacts 34a close electric valves 24 and 25 start rectifying and apply a direct current voltage to the conductors 18 and 23, thereby energizing the field winding 10a of the motor and energizing the operating coil of the field protective relay 35 which in responding to energization closes its contacts 35a thereby partially to complete an energizing circuit for the operating coil of the control relay 14. As previously pointed out, an alternating voltage is derived from the secondary winding of the transformer 15 by means of the phase shifting network 19, 20 and is applied through the grid transformer 21 to the grid circuit of the electric valves 12 and 13. Since the timing circuit including the capacitor 26 is connected across the direct current busses 18 and 23, the capacitor 26 will become charged to a value corresponding to the voltage difference between the bus 18 and the point of adjustment of the slider of resistor 28 on the voltage divider resistor 22.

The motor 10 is started by momentarily depressing and releasing the start push button 32. The upper contacts of the start push button 32 in closing complete the energizing circuit for the operating coil of the control relay 14 which in responding to energization closes its normally open contacts 14a, 14b, and 14c and opens its normally closed contacts 14d. Contacts 14d, in opening, interrupt the dynamic braking circuit for the armature of motor 10 and contacts 14c in closing complete a holding circuit for the operating coil of relay 14 independent of the contacts of start push button 32 which may now be released. Contacts 14a and 14b, in closing, complete the connections between the anodes 12a and 13a of the valves 12 and 13 and the taps 15a and 15b of the secondary winding of the supply transformer 15. When the lower contacts of the start push button 32 were depressed, a discharge circuit for the capacitor 26 was completed through the resistor 37. This resulted in discharging the capacitor 26 so that the voltage of the junction point of the capacitor 26 and the resistor 27 was decreased substantially to the voltage of the conductor 18. Consequently, at the instant of releasing the push button 32, the direct current bias voltage applied to the grid circuit of the valves 12 and 13 is substantially zero and the alternating component of the grid voltage is dephased with respect to the anode voltage by 90 electrical degrees lagging. As a result of this dephased alternating component of the grid voltage, the electric valves 12 and 13 begin conducting and transmitting current to the armature of motor 10. However, the instant that the armature of the motor 10 begins to rotate, a countervoltage is developed and the voltage applied from the positive terminal of the motor 10 to the cathodes of the electric valves 12 and 13 makes the voltage of the cathodes positive with respect to the voltage of the grids. This is the same effect as though a negative bias voltage were applied to the grids, and therefore the result is to retard the phase of the grid voltage with respect to the anode voltage so that immediately following the instant at which the push button 32 is released, the net grid voltage is substantially 180 degrees out of phase with the anode voltage and only a small current is supplied to the armature of the motor 10.

At the instant at which the push button 32 is released, the capacitor 26 begins to charge so that the voltage across its terminal increases as the charge increases. As the voltage of the junction point between the capacitor 26 and resistor 27 becomes increasingly positive, the phase of the grid voltage of valves 12 and 13 is advanced, and this results in increasing the current supplied to the motor 10. The variable direct current component bias voltage applied to the grids of the valves 12 and 13 is dependent upon the difference of the voltage across the capacitor 26 and the countervoltage of the motor 10. And the polarity of this component is such that it is positive when the countervoltage is less than the voltage across the capacitor 26 and negative when the armature voltage is greater than the voltage across capacitor 26. Thus this feedback connection between the armature of the motor 10 and the cathodes of the valves 12 and 13 tends to cause the speed of the motor to be increased in proportion to the increasing charge on the capacitor 26. In other words, this armature feedback is incorporated because the armature voltage tends to be in equilibrium with the voltage across the capacitor 26 as adjusted by the position of the slider on the voltage divider 22. In this connection, motor speed is assumed to be proportional to countervoltage.

By adjusting the position of the slider on voltage divider 22, the operating speed of motor 10 can be preset to any desired value within the range of operating speeds, and the time required to accelerate the motor to this preset speed can be adjusted by adjusting the position of the slider on adjustable resistor 28 in the timing circuit.

The sensitivity of this acceleration control is a function of the peak to peak value of the voltage across the secondary winding of the grid transformer 21; the smaller this voltage the smaller the change in armature voltage or "regulation" of armature voltage necessary to give minimum to maximum phase shift in the voltage of the grids with respect to the anode voltage of the electric valves 12 and 13.

The voltage across the conductors 18 and 23 is purposely made greater than the armature voltage of the motor 10 in order to provide the positive grid bias necessary to vary the phase of the grid voltages of valves 12 and 13 to full on. It will be noted that the field winding 10a of the motor 10 is connected across the busses 18 and 23. Should it not be feasible to operate the field at a voltage greater than the armature voltage, this additional voltage for positive direct current grid bias can be obtained by utilizing the peak value of the voltage wave supplying the field excitation by connecting a resistor in series with the positive end of voltage divider 22 and then connecting a capacitor across the voltage divider 22. The result of this connection would be that the capacitor would become charged to the peak value of the voltage wave and would maintain peak value voltage across the terminals of voltage divider 22.

The motor may be stopped by depressing the stop push button switch 33 to open the normally closed contacts and to close the normally open lower contacts 33a. The lower contacts 33a in closing complete a discharge circuit for the capacitor 26 through the resistor 37. As a result of capacitor 26 becoming discharged, the phase of the grid voltage of valves 12 and 13 is retarded so that the current transmitted by the valves 12 and 13 to the armature of the motor 10 is reduced substantially to zero. Contacts 33 in opening interrupt the energizing circuit for the operating coil of control relay 14 which, in response to deenergization open its normally open contacts 14a, 14b, and 14c and closes its normally closed contacts 14d to complete a dynamic braking circuit for the armature of the motor 10 through the dynamic braking resistor 36. Contacts 14a and 14b in opening interrupt the connections between the anodes of the valves 12 and 13 and the taps 15a and 15b of the secondary winding of the transformer 15. Owing to the prior reduction of the current transmitted by the valves 12 and 13 to zero as a result of the discharge of capacitor 26, no arcing takes place at the contacts 14a and 14b and consequently the life of these contacts is correspondingly increased.

Although in accordance with the provisions of the patent statutes, this invention is described as embodied in concrete form and the principle thereof has been described together with the best mode in which it is now contemplated applying that principle, it will be understood that the apparatus and elements shown and described are merely illustrative and that the invention is not limited thereto since alterations and modifications will readily suggest themselves to persons skilled in the art without departing from the true spirit of this invention or from the scope of the annexed claims.

What we claim as new and desire to secure by Letters Patent of the United States is:

1. A starting control system comprising in combination, an electric motor, a source of alternating voltage, an electric valve having an anode and a cathode connected between said source and said motor and provided with a control grid for controlling the transmission of current to the armature of said motor, means for controlling the voltage of said grid to effect acceleration of said motor in a predetermined time comprising an electrical energy storage device, a connection from said energy storage device to said grid and a timing circuit including said electrical energy storage device and a second electric valve connected across said source so that the voltage of said grid relative to the voltage of said cathode is dependent on the difference of the voltage across said energy storage device and the countervoltage of said motor.

2. A starting control system comprising in combination, an electric motor, a source of alternating voltage, an electric valve having an anode and a cathode connected between said source and the armature of said motor and provided with a control grid for controlling the transmission of current to said armature, means for controlling the voltage of said grid to effect acceleration of said motor comprising an independent timing circuit including a second electric valve and an electrical energy storage device connected across said source and a connection from said device to said grid so that the voltage of the grid relative to said cathode is dependent on the difference of the countervoltage of said motor and the voltage across said energy storage device, and a starting device for initiating a variation in the voltage across said energy storage device thereby to initiate acceleration of said motor.

3. A starting control system comprising in combination, an electric motor, a source of alternating voltage, an electric valve having an anode and a cathode connected between said source and the armature of said motor and provided with a control grid for controlling the transmission of current to said armature, means for controlling the voltage of said grid to effect acceleration of said motor comprising an independent timing circuit including a second electric valve and an electrical energy storage device connected across said source and a connection from said device to said grid so that the voltage of the grid relative to said cathode is dependent on the difference of the countervoltage of said motor and the voltage across said energy storage device, a switching device having contacts between said source and said anode, and a starting device for closing said contacts and also initiating a variation in the voltage across said energy storage device to initiate acceleration of said motor.

4. A starting control system comprising in combination, an electric motor, a source of alternating voltage, an electric valve having an anode and a cathode connected between said source and the armature of said motor and provided with a control grid for controlling the transmission of current to said armature, means for controlling the voltage of said grid to effect acceleration of said motor comprising an independent timing circuit including a second electric valve and an electrical energy storage device connected across said source and a connection from said device to said grid so that the voltage of the grid relative to said cathode is dependent on the difference of the countervoltage of said motor and the voltage across said energy storage device, and a starting switching device operable to discharge said energy storage device and to initiate the charging of said device thereby to initiate acceleration of said motor.

5. A starting control system comprising in combination, an electric motor, a source of alternating voltage, an electric valve having an anode and a cathode connected between said source and the armature of said motor and provided with a control grid for controlling the transmission of current to said armature, means for impressing on said grid a dephased alternating voltage derived from said source, and means for controlling the voltage of said grid to effect acceleration of said motor comprising a timing circuit including an electrical energy storage device and unidirectional conducting means connected across said source and connections from said storage device to said grid for applying to said grid a direct current bias voltage variable with the difference of the voltage across said storage device and the countervoltage of said motor to vary the phase of the beginning of transmission of current by said valve with respect to the anode voltage of said valve.

6. A starting control system comprising in combination, an electric motor, a supply transformer having connections to a source of alternating voltage, an electric valve having an anode and a cathode connected between the armature of said motor and points on the secondary winding of said transformer, said valve being provided with a control grid for controlling the transmission of current to said armature, means for impressing on said grid a dephased voltage derived from the voltage of said secondary winding, and means for controlling the voltage of said grid to effect acceleration of said motor comprising a timing circuit including a capacitor and a unidirectional conducting device connected across points of said secondary of greater voltage difference than the voltage difference of said first mentioned points and connections from said capacitor to said grid for applying to said grid a direct current bias voltage variable with the difference of the voltage across said capacitor and the countervoltage of said motor to vary the phase of the beginning of transmission of current by said valve with respect to the anode voltage of said valve.

7. A starting control system comprising in combination, an electric motor, a source of alternating voltage, an electric valve having an anode and a cathode connected between the armature of said motor and said source and provided with a control grid for controlling the transmission of current to said armature, means for impressing on said grid a dephased voltage derived from said source, means for controlling the voltage of said grid to effect acceleration of said motor comprising a timing circuit including a capacitor and a unidirectional conducting device connected across said source and having connections to said grid to apply to said grid a direct current bias voltage varying as the difference between the voltage across said capacitor and the countervoltage of said motor to vary the phase relationship of the beginning of transmission of current by said valve with respect to the anode voltage, a stop control device, and a switching device having contacts between said anode and said source and controlled by said control device for disconnecting said anodes from said source, and means responsive to said operation of said control device for discharging said capacitor to retard the phase of the voltage of said grid and discharge the current transmitted by said valve.

8. A starting control system comprising in combination, an electric motor, a source of alternating voltage, an electric valve having an anode and a cathode connected between said source and the armature of said motor and provided with a control grid for controlling the transmission of current to said armature, means for controlling the voltage of said grid to effect acceleration of said motor comprising an independent timing circuit including a second electric valve and an electrical energy storage device connected across said source and a connection from said device to said grid so that the voltage of the grid relative to said cathode is dependent on the difference of the counter-voltage of said motor and the voltage across said energy storage device, an adjustable voltage drop device included in circuit with said energy storage device for presetting the speed of said motor and a starting device for initiating charging of said energy storage device thereby to initiate acceleration of said motor to said preset speed.

9. A starting control system comprising in combination, an electric motor, a source of alternating voltage, an electric valve having an anode and a cathode connected between said source and the armature of said motor and provided with a control grid for controlling the transmission of current to said armature, means for controlling the voltage of said grid to effect acceleration of said motor comprising an independent timing circuit connected across said source including a capacitor and a connection from said capacitor to said grid so that the voltage of said grid relative to said cathode is dependent on the difference of the counter-voltage of said motor and the voltage across said capacitor, an adjustable resistor connected in circuit with said capacitor for presetting the speed of said motor to a desired value, and a starting switching device operable to discharge said capacitor and to initiate the charging of said capacitor thereby to initiate acceleration of said motor to said preset speed.

ELMO E. MOYER.
ORRIN W. LIVINGSTON.